2,838,410
METHODS AND COMPOSITIONS FOR IMPROVING CLAY PRODUCTS

William C. Francis, Pittsburg, Kans., and Forrest L. Turbett and Leo C. D. Groenweghe, Joplin, Mo., assignors to Spencer Chemical Company, a corporation of Missouri No Drawing. Application October 27, 1955
Serial No. 543,264

8 Claims. (Cl. 106—72)

This invention relates generally to the manufacture of ceramic products, such as brick and tile. More particularly, this invention relates to the addition of ammonia, ammonium bicarbonate, and ammonium nitrate, separately and in various combinations with each other and with other inorganic ammonium salts, to clay during the manufacture of kiln-fired clay products for the purpose of effectively controlling "coring" and "scumming" and thereby producing clay products having superior strength and dimensional characteristics.

In the brick and tile industry, raw clay or shale obtained by strip mining is first crushed and pulverized. The finely divided clay or shale is then combined with varying amounts of water, formed into the desired shapes, dried, and fired in either periodic (batch) or tunnel (continuous) kilns to form the finished clay products. The term "clay" as used herein is intended to embrace both clay and shale.

During the firing process, various clay components are believed to be oxidized by the kiln gases and the clay then indurated (or hardened) by long exposure to higher temperatures (up to 2000° F.). Improper firing, particularly with clays high in sulfur and/or carbon content, often results in an undesirable phenomenon, termed "coring," which seriously affects strength and dimensional properties in the final product. "Coring," as the name implies, is characterized by a black, blue, gray, brown or red core in the finished clay product which may extend completely to the surface. Black coring is generally the most severe. Coring is believed to result from the vitrification of an outer layer of unoxidized or partially oxidized clay before the oxidation of the interior clay has started or is complete. This in effect seals the interior of the clay product from the further passage of oxidizing gases, resulting in the unoxidized or partially oxidized core. Certain core has been shown to possess magnetic properties, hence it is believed that such core contains iron in a partially oxidized or unoxidized state as, for instance, Fe, FeO, FeS and $Fe_3O_4$, all of which are dark in color. Also, coring is more prevalent in high sulfur clays, so it is believed that FeS and $FeS_2$ (pyrite) contribute greatly to it. A secondary disadvantage of coring, particularly in the brick and tile industry, is a discoloration which results from the "bleeding through" of the core. Such a discoloration is very unsightly, for instance, on the brick and mortar joints of a brick wall.

Coring can be successfully controlled in certain clays by lengthening the firing cycle so that oxidation is complete. In other clays, coring cannot be economically controlled by lengthening the firing cycle. The control of coring by chemical additives is highly desirable in either case so that the firing cycle can be shortened and kiln production substantially increased.

A problem closely allied to coring which confronts the ceramics industry is termed "scumming." Scumming occurs before and during the firing and consists of the formation of a scum on the exterior of clay products caused by the migration to the surface of certain soluble salts such as sulfates, chlorides, etc., and the "burning in" of such salts during firing. Migration to the surface of soluble salts which occurs during storage or subsequent use is usually termed "efflorescence" and its control is closely related to the control of scumming.

Attempts have been made in the past to control coring and scumming. However, no success has been achieved in controlling both by a balanced additive. Scumming has been controlled in some cases by the use of barium carbonate; however, barium carbonate has little or no effect on coring. The problem of coring has been attacked by adding pre-roasted clay to the clay mix so that part of the oxidation is already accomplished. Although the final firing cycle is reduced somewhat, the total energy requirements for firing are the same hence no advantage is gained. Another approach to the problem of coring has been to more finely divide the clay so that more surface is exposed to oxidation, but this has not proven too successful. Also, neither of these two proposed methods of controlling coring has had any effect on scumming.

A recently proposed method of controlling coring involves the addition of ammonium chloride to the clay mix prior to firing. It is stated that the ammonium chloride lowers the temperature of dissociation of the sulfide compounds thought to be responsible in main for coring, thus allowing them to be oxidized in a shorter period of time. However, ammonium chloride used separately does not give good control in many clays and in fact has adverse effects when used with some clays, particularly with respect to the structural properties and the water absorption properties of the resulting products. Also, because of its inherent acidity ammonium chloride causes serious corrosion problems in the metal clay products manufacturing equipment and produces a prominent red discoloration throughout buff-colored clay products. Because of these critical shortcomings, ammonium chloride has had very limited application in the industry.

In attacking the above-described problems of the brick, tile and related industries, we have discovered that ammonia, ammonium bicarbonate, and ammonium nitrate, separately and in various combinations with each other and with other inorganic ammonium salts, will effectively control coring and in many cases scumming in kiln-fired clay products. We have also found that the strength and dimensional characteristics of the resulting clay products have been enhanced by the use of certain of the above-enumerated additives and additive combinations. The inorganic ammonium salts that may best be used, other than ammonium bicarbonate and ammonium nitrate, are the common inorganic ammonium salts such as ammonium chloride, ammonium sulfate and ammonium phosphate. Additive combinations of ammonium chloride together with ammonia, ammonium bicarbonate or mixtures of the two are surprisingly more effective in controlling coring than ammonium chloride used separately. Also, the presence of ammonia, ammonium bicarbonate, or mixtures of the two in the additive combinations containing ammonium chloride apparently minimizes many of the critical shortcomings of ammonium chloride used separately, such as the corrosion of metal equipment, staining of buff-colored clay products, etc.

There are many variations in the chemical composition of clays from which brick, tile and related products are made. Thus, some clays result in a buff-colored product when fired whereas other clays result in a characteristic brick red product when fired. Clays also vary widely in pH values, some clays being acidic and other clays being basic. It appears that there is an optimum pH range for the clay mix from which the clay products are formed and that this pH range is from about pH 5 to about pH 10. However, due to the constantly changing pH values of clay, which act as ion exchangers, this range may vary even more widely.

Because of these differences in clays, the optimum additive or additive combination varies slightly from one clay to another.

We have found that where coring and scumming conditions are not too severe, ammonia, ammonium bicarbonate and ammonium nitrate may be used separately as effective additives. However, where conditions are more severe, we have found that it is necessary to use a combination of an inorganic ammonium salt, preferably ammonium nitrate, with ammonia, ammonium bicarbonate or a mixture of the two. Ammonium nitrate in combination with ammonia appears to give the best results of all additive combinations.

With regard to additive concentration in the clay mix, we have found that the total amount of additive or additive combination need not exceed about 2% by weight of the dry clay. Amounts in excess of 2% may be used; however, increased amounts apparently do not increase the desired effects proportionally. We prefer a concentration below 1%, and have found that concentrations as low as one-tenth percent additive or additive combination give good results. In an additive combination consisting essentially of an inorganic ammonium salt and a member of the group consisting of ammonia, ammonium bicarbonate and mixtures thereof, the lower limit of inorganic ammonium salt (preferably ammonium nitrate) can be as low as about 0.2% by weight (based on dry clay) and the lower limit of the member of the group consisting of ammonia, ammonium bicarbonate, and mixtures thereof can be as low as about .002% by weight (based on dry clay).

With additive combinations, the ratio of inorganic ammonium salt (preferably ammonium nitrate) to ammonia, ammonium bicarbonate or a mixture of the two varies over a wide range. Generally speaking, we have found that there should be an excess of the inorganic ammonium salt to the ammonia, ammonium bicarbonate or mixtures of the two. We have further found that a weight ratio in the range of about 3:1 to about 12:1 results in a very effective additive combination, with even higher ratios (up to 60:1) being workable in many cases.

It is apparent that more than one inorganic ammonium salt may be used in the additive combinations of this invention. Thus, such an additive combination may include a mixture of ammonium nitrate and ammonium sulfate together with ammonia, ammonium bicarbonate or mixtures of the two. Because of this, the term "inorganic ammonium salt" is intended to comprehend the salts individually as well as apparent mixtures of them.

Other obvious equivalencies that are meant to be included within the scope of this invention are (a) the substitution of ammonia and carbon dioxide for ammonium bicarbonate or mixtures of ammonia and ammonium bicarbonate; and (b) the substitution of nitric acid and ammonia from ammonium nitrate. Other equally obvious equivalencies are also intended to be included.

The practice of this invention is very simple inasmuch as all of the additives and additive combinations of this invention are water soluble. In the preferred mode of practicing this invention, the additive or additive combination is first prepared as a water solution of known concentration and composition. This solution is then introduced in the proper amount into the clay mix in the pug mill, which is the apparatus in which water and clay are admixed to form mud of the right consistency to be fed to the extruders or molds in which the clay products are formed. This procedure can be readily adapted to the various processes for making clay products such as the soft mud process, the stiff mud process and the dry press process, all of which vary significantly only by the water content of the mud fed into the clay product forming unit.

*Examples.*—The following examples clearly illustrate the methods and compositions of this invention.

The raw shale used in these examples produced buff-colored clay products when fired and had an analysis by weight per cent as shown in Table I after drying at 105° C., to remove the free moisture which amounted to about 2.4 percent by weight of the damp shale.

*Table I*

| Ignition Loss,[1] Percent | $SiO_2$, Percent | CaO, Percent | $Al_2O_3$, Percent | $Fe_2O_3$, Percent | Total S (as $SO_3$), Percent | KCl [2] NaCl, Percent | $MnO_2$, Percent | pH [3] Percent |
|---|---|---|---|---|---|---|---|---|
| 10.29 | 54.15 | 1.38 | 20.89 | 6.73 | 3.46 | 3.86 | 0.05 | 4.7 |

[1] Ignition loss of dry shale.
[2] Mixed alkali metals reported as chlorides.
[3] Determined from a mixture of 5 g. clay in 50 ml. water.

To determine the composition of the crystalline non-clay minerals contained in the raw shale, a sample of the raw shale was repeatedly pulped and elutriated and the crystalline non-clay minerals separated in free form. These amounts to 7.6% by weight of the dry shale and had the following partial analysis by weight percent after drying at 105° C.

*Table II*

| Ignition Loss, Percent | $SiO_2$ Percent | $Al_2O_3$, Percent | Total Fe, Percent | Sulfur, Percent | Sulfides Acid released, Percent | Free C (By Ignition), Percent |
|---|---|---|---|---|---|---|
| 23.13 | 22.47 | 2.70 | 28.97 | 11.24 | 0.20 | 5.07 |

It can readily be seen that these minerals contained a high percentage of pyritic materials.

The above-described clay was deliberately chosen as one which caused severe coring problems because of its high sulfur content. A typical shale which does not present a serious coring problem has a sulfur content (as $SO_3$) after drying of less than 0.5 percent by weight as compared to 3.46 percent by weight (as shown in Table I) for the shale used in these examples. Because of the good results obtained by using these additives with this undesirable shale, the conclusion is drawn that the firing cycle could be shortened considerably for clays and shales presenting less serious coring problems, thus increasing production.

The rating system for coring in Tables III–V is based on the severity of the coring as determined from visual observation. The procedure was as follows: The experimental bricks were broken in half and the cores rated numerically. Both the area and color of the cores were considered; the worse the core, the higher the numerical rating. No core rating of lower than 4 was given to bricks that showed a trace of black coring. Ratings from 1 to 3 were used only for bricks showing the milder red or brown coring in varying degrees.

The rating system for scumming in Table V is arbitrary; the higher the rating, the worse the scumming. Both density of scum and area covered are considered in the evaluation. A rating of ten may indicate a locally dense snow-white scum or a less severe scum covering a large area, whereas a rating of zero indicates no scum at all.

In Tables III–V, experimental data is set out for bricks which were prepared from the above-described shale containing varying amounts of the additives as shown. These bricks, approximately 4″ by 2″ by 1″ in size, were prepared by mixing the additives with wet clay, forming the bricks in an experimental brick press, partially drying the bricks and then firing them on firing cars in a production-size tunnel kiln in full production for approximately 48 hours at a maximum temperature of 1970° F. In many cases, bricks containing the same amount and kind of additives were run through the same firing cycles at different times to reflect duplication of results. Series A shows data for the bricks initially run while Series B shows data for the duplicates.

In Tables III–V, blanks containing no additives were run in adjacent firing positions on the firing car to bricks containing additives to serve as checks. These blanks were identical in every respect to the test bricks except for additive content. For purposes of comparison, data on applicable blanks is reported following data on each brick containing additives. The wide variation in coring ratings is due to the varying conditions found in the commercial tunnel kiln. For this reason each brick containing additives should be compared only with the blank immediately following.

Table III sets out experimental data for bricks containing ammonia, ammonium bicarbonate, and ammonium nitrate as separate additives. By comparing the blanks with the additive-containing bricks, it can be readily seen that coring was reduced in every case in the additive-containing bricks.

*Table III*

| Additive | Percent | Core Rating | |
|---|---|---|---|
| | | Series A | Series B |
| $NH_3$ | .1 | 5 | 5 |
| Blank | | 7 | 8 |
| $NH_3$ | .2 | 5 | 5 |
| Blank | | 7 | 8 |
| $NH_3$ | .4 | 4 | |
| Blank | | 7 | |
| $NH_3$ | .8 | 4 | |
| Blank | | 6 | |
| $NH_4HCO_3$ | .1 | 5 | 6 |
| Blank | | 5 | 7 |
| $NH_4HCO_3$ | .2 | 5 | 7 |
| Blank | | 5 | 9 |
| $NH_4HCO_3$ | .4 | 4 | |
| Blank | | 5 | |
| $NH_4HCO_3$ | .8 | 4 | |
| Blank | | 5 | |
| $NH_4HCO_3$ | 1.0 | 3 | 3 |
| Blank | | 5 | 8 |
| $NH_4NO_3$ | .1 | 7 | 5 |
| Blank | | 8 | 7 |
| $NH_4NO_3$ | .2 | 6 | 5 |
| Blank | | 8 | 8 |
| $NH_4NO_3$ | .4 | 6 | |
| Blank | | 8 | |
| $NH_4NO_3$ | .8 | 5 | |
| Blank | | 9 | |

Table IV sets out experimental data for bricks containing additive combinations of various inorganic ammonium salts togther with either ammonia or ammonium bicarbonate. Again, it can be readily seen that coring was substantially reduced in each additive-containing brick.

*Table IV*

| Additives | | | | Core Rating | |
|---|---|---|---|---|---|
| Additive A | Percent | Additive B | Percent | Series A | Series B |
| $NH_4HCO_3$ | .1 | $NH_3$ | .2 | 4 | 4 |
| Blank | | | | 6 | 7 |
| $NH_4NO_3$ | .1 | $NH_3$ | .2 | 4 | 5 |
| Blank | | | | 6 | 7 |
| $NH_4NO_3$ | .1 | $NH_4HCO_3$ | .4 | 4 | 3 |
| Blank | | | | 7 | 9 |
| $NH_4Cl$ | .1 | $NH_3$ | .2 | 2 | 4 |
| Blank | | | | 8 | 8 |
| $NH_4Cl$ | .1 | $NH_4HCO_3$ | .4 | 4 | 4 |
| Blank | | | | 7 | 8 |
| $(NH_4)_2SO_4$ | .1 | $NH_3$ | .2 | 4 | 3 |
| Blank | | | | 7 | 8 |
| $(NH_4)_2SO_4$ | .1 | $NH_4HCO_3$ | .4 | 5 | 7 |
| Blank | | | | 8 | 10 |
| $NH_4H_2PO_4$ | .1 | $NH_3$ | .2 | 4 | 4 |
| Blank | | | | 5 | 8 |
| $NH_4H_2PO_4$ | .1 | $NH_4HCO_3$ | .4 | 4 | 4 |
| Blank | | | | 6 | 8 |

Table V sets out experimental data for bricks containing additive combinations of ammonium nitrate together with either ammonia or ammonium bicarbonate. Data on both coring and scumming indicate the improvement resulting from the use of the additive combinations. The pH values shown in Table V were obtained by diluting 5 grams of the respective mixtures with 50 mililiters of water and determining pH by means of a Beckman pH meter. By comparison, the pH of blanks averaged 4.7.

*Table V*

| Additives | | | | Ratings | | | | pH |
|---|---|---|---|---|---|---|---|---|
| | | | | Series A | | Series B | | |
| Additive A | Percent | Additive B | Percent | Core | Scum | Core | Scum | |
| $NH_4NO_3$ | 0.3 | $NH_4HCO_3$ | 0.1 | 6 | 2 | 5 | 2 | 6.8 |
| Blank | | | | 8 | 1 | 6 | 2 | |
| $NH_4NO_3$ | 0.3 | $NH_4HCO_3$ | 0.2 | 5 | 2 | 4 | 1 | 7.1 |
| Blank | | | | 8 | 1 | 8 | 2 | |
| $NH_4NO_3$ | 0.3 | $NH_4HCO_3$ | 0.3 | 6 | 1 | 5 | 1 | 8.1 |
| Blank | | | | 8 | 1 | 9 | 2 | |
| $NH_4NO_3$ | 0.4 | $NH_4HCO_3$ | 0.1 | 5 | 1 | 4 | 1 | 6.8 |
| Blank | | | | 10 | 1 | 6 | 2 | |
| $NH_4NO_3$ | 0.4 | $NH_4HCO_3$ | 0.2 | 5 | 1 | 4 | 1 | 7.2 |
| Blank | | | | 10 | 1 | 8 | 2 | |
| $NH_4NO_3$ | 0.4 | $NH_4HCO_3$ | 0.3 | 4 | 2 | 4 | 3 | |
| Blank | | | | 7 | 2 | 9 | 2 | |
| $NH_4NO_3$ | 0.4 | $NH_4HCO_3$ | 0.4 | 5 | 2 | 4 | 2 | 7.8 |
| Blank | | | | 7 | 2 | 8 | 2 | |
| $NH_4NO_3$ | 0.3 | $NH_3$ | 0.05 | 6 | 0 | 4 | 0 | 8.7 |
| Blank | | | | 8 | 2 | 8 | 2 | |
| $NH_4NO_3$ | 0.3 | $NH_3$ | 0.1 | 4 | 1 | 5 | 0 | 7.7 |
| Blank | | | | 8 | 2 | 7 | 2 | |
| $NH_4NO_3$ | 0.3 | $NH_3$ | 0.2 | 4 | 1 | 4 | 1 | |
| Blank | | | | 8 | 2 | 8 | 2 | |
| $NH_4NO_3$ | 0.4 | $NH_3$ | 0.05 | 3 | 0 | 5 | 0 | 7.3 |
| Blank | | | | 8 | 2 | 9 | 2 | |
| $NH_4NO_3$ | 0.4 | $NH_3$ | 0.1 | 3 | 0 | 5 | 0 | 8.6 |
| Blank | | | | 7 | 2 | 7 | 2 | |
| $NH_4NO_3$ | 0.4 | $NH_3$ | 0.2 | 3 | 1 | 4 | 1 | 9.6 |
| Blank | | | | 7 | 2 | 6 | 2 | |

In Table VI, the results of a test are shown which test was performed under actual plant conditions using a production-size pug mill, extruder and other equipment. Firing was done in a production-size tunnel kiln in full production in which the firing cycle was 49 hours and the maximum temperature 1930° F. The bricks for which results are tabulated in Table VI were located in various positions from top to bottom on the firing car and therefore were subjected to varying firing conditions. The variation in coring results is due to these varying firing conditions. The procedure for determining coring ratings varied from that used in Tables III–V in that the bricks were sawed lengthwise in half to expose the greatest interior surface and the ratings made from the exposed core. Scumming was light on all bricks but appeared slightly more noticeable on the blanks. The blanks for which data are reported in Table VI contain 0.1 percent barium carbonate, which is a typical amount added by many brick yards to control scumming. The superiority of the additive-containing bricks over the blanks is obvious from the average of the coring results.

Table VI

| Blanks (0.1% BaCO₃) | Bricks containing .4% NH₄NO₃ and .1% NH₃ |
|---|---|
| 6 | 3 |
| 8 | 2 |
| 8 | 7 |
| 8 | 4 |
| 7 | 7 |
| 7 | 3 |
| 8 | 2 |
| 8 | 3 |
| 7 | 4 |
| 8 | 6 |
| 8 | 4 |
| 8 | 7 |
| 8 | 7 |
| 7 | 7 |
| 7 | 6 |
| 7 | 5 |
| 6 | 6 |
| 6 | 2 |
| 8 | 6 |
| 8 | 3 |
| 9 | 3 |
| 9 | 3 |
| 9 | 5 |
| 8 | 5 |
| Average 7.68 | Average 4.58 |

Table VII sets out experimental data which show the improved dimensional characteristics of the additive-containing bricks over the blanks. The bricks for which data are reported in Table VII were made in production-size equipment and fired for ten days in a beehive (batch) kiln. The data in Table VII include the length in millimeters of the bricks, the percent of bricks of that length in the run, and the maximum variation between bricks in the run. It is significant to note that the additive-containing bricks were more uniform in size and had less maximum size variation than the blanks.

Table VII

| Blanks (0.1% BaCO₃) | | Bricks containing .4% NH₄NO₃ and .1% NH₃ | |
|---|---|---|---|
| Length (in mm.) | Percent of total in run | Length | Percent of total in run |
| 198 | 2.2 | 191 | 8.7 |
| 197 | 0.0 | 190 | 8.7 |
| 196 | 2.2 | 189 | 28.2 |
| 195 | 8.9 | 188 | 47.7 |
| 194 | 22.2 | 187 | 0.0 |
| 193 | 11.1 | 186 | 4.4 |
| 192 | 11.1 | 185 | 2.2 |
| 191 | 11.1 | Maximum Variation 6 mm. | |
| 190 | 17.7 | | |
| 189 | 8.9 | | |
| 188 | 4.4 | | |
| Maximum Variation 10 mm. | | | |

Table VIII sets out experimental data which shows the improved strength characteristics of the additive-containing bricks over the blanks. The bricks for which data is reported in Table VIII were made in production-size equipment and fired for ten days in a beehive (batch) kiln. Data in Table VIII indicate the results of compressive strength tests on eight bricks chosen at random from both the blanks and the additive-containing bricks of the run. The increased strength of the additive-containing bricks is readily apparent.

Table VIII

| Blanks (0.1% BaCO₃) Compressive strength (lb./sq. in.) | Bricks containing .4% NH₄NO₃ and .1% NH₃ Compressive strength (lb./sq. in.) |
|---|---|
| 6,110 | 7,620 |
| 5,880 | 7,650 |
| 6,880 | 7,600 |
| 6,050 | 7,350 |
| 6,000 | 7,480 |
| 5,900 | 7,600 |
| 5,880 | 7,620 |
| 5,780 | 7,600 |
| Average 6,060 | Average 7,565 |

It was also determined that the additive-containing bricks for which data is shown in Tables VI and VIII did not have increased maximum water absorption over that of the blanks. That is significant in that bricks treated with chemical additives of the prior art have shown increased water absorption tendencies in many cases. It is desirable that water absorption be kept to a minimum in kiln-fired clay products.

The detailed description and examples given herein are not to be construed as limiting the scope of this invention, and all modifications apparent to those skilled in the art are intended to be included.

We claim:

1. The method of manufacturing improved kiln-fired clay products which comprises: adding to the clay mix from which the clay products are made a small amount of an additive combination consisting essentially of (a) from at least about .02% by weight (based on dry clay) of a member of the group consisting of ammonium nitrate, ammonium sulfate, ammonium chloride, ammonium phosphate and mixtures thereof, and (b) from at least about .002% by weight (based on dry clay) of a member of the group consisting of ammonia, ammonium bicarbonate and mixtures thereof, said additive combination being added in an amount equal to at least about 0.1% by weight (based on dry clay) of the clay mix; forming clay products from such admixture; and firing the clay products.

2. The method of manufacturing improved kiln-fired clay products which comprises: adding in the form of an aqueous solution to the clay mix from which the clay products are made a small amount of an additive combination consisting essentially of (a) from at least about .02% by weight (based on dry clay) of, a member of the group consisting of ammonium nitrate, ammonium sulfate, ammonium chloride, ammonium phosphate and mixtures thereof, and (b) from at least about .002% by weight (based on dry clay) of a member of the group consisting of ammonia, ammonium bicarbonate and mixtures thereof, said additive combination being added in an amount equal to at least about 0.1% by weight (based on dry clay) of the clay mix; forming clay products from such admixture; and firing the clay products.

3. The method of manufacturing improved kiln-fired clay products such as brick and tile which comprises: adding to the clay mix from which the clay products are made a small amount of an additive combination consisting essentially of (a) from at least about .02% by weight (based on dry clay) of ammonium nitrate, and (b) from at least about .002% by weight (based on dry clay) of a member of the group consisting of ammonia, ammonium bicarbonate and mixtures thereof, said additive combination being added in an amount equal to at least about 0.1% by weight (based on dry clay) of the clay mix; forming clay products from such admixture; and firing the clay products.

4. The method of manufacturing improved kiln-fired clay products such as brick and tile which comprises: adding in the form of an aqueous solution to the clay mix from which the clay products are made a small amount of an additive combination consisting essentially of (a) from at least about .02% by weight (based on dry clay) of ammonium nitrate, and (b) from at least about .002% by weight (based on dry clay) of a member of the group consisting of ammonia, ammonium bicarbonate and mixtures thereof, said additive combination being added in an amount equal to at least about 0.1% by weight (based on dry clay) of the clay mix; forming clay products from such admixture; and firing the clay products.

5. The method of manufacturing improved kiln-fired clay products such as brick and tile which comprises: adding to the clay mix from which the clay products are made a small amount of an additive combination consisting essentially of (a) from at least about .02% by weight (based on dry clay) of ammonium nitrate, and (b) from at least about .002% by weight (based on dry clay) of ammonia, said additive combination being added in an amount equal to at least about 0.1% by weight (based on dry clay) of the clay mix; forming clay products from such admixture; and firing the clay products.

6. The method of manufacturing improved kiln-fired clay products such as brick and tile which comprises: adding in the form of an aqueous solution to the clay mix from which the clay products are made a small amount of an additive combination consisting essentially of (a) from at least about .02% by weight (based on dry clay) of ammonium nitrate, and (b) from at least about .002% by weight (based on dry clay) of ammonia, said additive combination being added in an amount equal to at least about 0.1% by weight (based on dry clay) of the clay mix; forming clay products from such admixture; and firing the clay products.

7. A method of manufacturing improved kiln-fired clay products such as brick and tile which comprises: adding to the clay mix from which the clay products are made a small amount of an additive combination consisting essentially of (a) from at least about .02% by weight (based on dry clay) of ammonium nitrate, and (b) from at least about .002% by weight (based on dry clay) of ammonium bicarbonate, said additive combination being added in an amount equal to at about nation being added in an amount equal to at least about 0.1% by weight (based on dry clay) of the clay mix; forming clay products from such admixture; and firing the clay products.

8. A method of manufacturing improved kiln-fired clay products such as brick and tile which comprises: adding in the form of an aqueous solution to the clay mix from which the clay products are made a small amount of an additive combination consisting essentially of (a) from at least about .02% by weight (based on dry clay) of ammonium nitrate, and (b) from at least about .002% by weight (based on dry clay) of ammonium bicarbonate, said additive combination being added in an amount equal to at least about 0.1% by weight (based on dry clay) of the clay mix; forming clay products from such admixture; and firing the clay products.

References Cited in the file of this patent

UNITED STATES PATENTS

| | | |
|---|---|---|
| 1,001,413 | Keppeler et al. | Aug. 22, 1911 |
| 1,256,513 | Blom | Feb. 19, 1918 |

FOREIGN PATENTS

| | | |
|---|---|---|
| 15,911 | Great Britain | Oct. 22, 1892 |
| 447,710 | Great Britain | May 25, 1936 |
| 650,748 | Germany | Sept. 30, 1937 |

UNITED STATES PATENT OFFICE
CERTIFICATE OF CORRECTION

Patent No. 2,838,410                            June 10, 1958

William C. Francis et al.

It is hereby certified that error appears in the printed specification of the above numbered patent requiring correction and that the said Letters Patent should read as corrected below.

Column 3, line 56, for "0.2%" read -- .02% --; column 8, line 18, for "VI" read -- VII --; column 10, line 7, strike out "nation being added in an amount equal to at about".

Signed and sealed this 19th day of August 1958.

(SEAL)
Attest:
KARL H. AXLINE
Attesting Officer

ROBERT C. WATSON
Commissioner of Patents